UNITED STATES PATENT OFFICE.

JOHN C. GOODRIDGE, JR., OF NEW YORK, N. Y.

IMPROVEMENT IN MANUFACTURE OF BETON.

Specification forming part of Letters Patent No. 194,085, dated August 14, 1877; application filed June 5, 1877.

*To all whom it may concern:*

Be it known that I, JOHN C. GOODRIDGE, Jr., of the city of New York, in the county of New York and State of New York, have invented a new and useful Improvement in Manufacture of Beton, of which the following is a specification:

The nature of this invention consists in a special mode of preparing cement and mixing it with sand and a specified quantity of water, and their manipulation in such manner as to make a beton or concrete which shall be more uniform in composition and stronger than any heretofore made, and without the unsightly and injurious checks and efflorescence which appear in all previous combinations of sand and cement.

In the method now employed of making beton or concrete, cement and sand are used without previously preparing the cement. In the Coignet methods sufficient water only is added to make a plastic pulverulent paste. This does not contain sufficient water to form hydrates, unless lime enters largely into the composition, in which case the moisture held by the lime is taken up by the cement during its crystallization, the lime absorbing its moisture from the air; but lime in a large quantity weakens the beton, from having but a low adhesive power in comparison with cement. Neither is it able to withstand the action of water or fit for under-ground work, as it does not become hard when kept constantly damp, nor does it become hard in the interior of large monoliths when it is removed from the effects caused by the atmosphere.

In the other and ordinary methods a larger quantity of water is used, sufficient to make a semi-liquid mass that will flow. This excess of water is forced out of the concrete by the contraction of the cement during its crystallization, and leaves the stone porous. It also prevents the proper ramming of the beton, and gives rise to the difficulty known as "*laitance,*" hereinafter described. On the other hand, a beton containing too little water becomes friable.

My process is as follows: When, in the construction of large monoliths or structures, largely under-ground, the checks and efflorescence which usually appear are not a serious objection. Sand and cement may be mixed in the proportion of from three to six parts of sand to one of cement. This may be done by means of machinery or by hoes, shovels, and rakes. During this process water is added by means of a hose or watering-pot having a rose jet. The water is added gradually until the sand and cement contains so much that a handful of the beton will, if tightly squeezed, allow a little water to exude, but will, when laid down, still retain the impression of the hand. The beton so mixed will have about the consistence of melting snow. It can be compacted in the same way, and pressure will force the moisture out of it. This condition, though difficult to describe, is learned at sight by the workmen, and the correct amount of water is more accurately gaged by trying the beton from time to time in the hand during its mixture (as it varies in different cements) than can be done by any rule of measurement. The beton is then placed in position and rammed, as described below.

The quantity of water thus gaged will be enough to form hydrates, in combination with the components of the cement, leaving no excess to be forced out during crystallization, and does not prevent the proper ramming of the beton, while there is not sufficient to cause *laitance*. But to obtain a perfect result where a finished surface is requisite, and to make a beton free from the deleterious ingredients that are found in all cements, and to insure the use of a proper quantity of water, I proceed as follows: Having obtained the heaviest slow-setting cement, the first step in this process is to separate from it the light, earthy impurities—the uncombined lime and clay and the soluble salts. This can be done to a considerable extent by a regulated current of air being driven against the cement while falling from a height, and in a proper inclosure; or it can be done by revolving screens, or by means of a centrifugal mill; and I claim these methods to be equivalents of the following. But the method which I prefer, and recommend as much more perfect, is to allow the cement to fall slowly into a box filled and constantly fed by a stream of water, the entrance of which is preferably near the bottom of the box. One side of the box is lower than the others, for the overflow of the water. Where a constant stream of water cannot be had the result may be obtained by agitating the cement with water in a swinging box or other convenient way, pouring off the water and supplying its place with fresh water from time to time.

A box may be placed in and on the bottom of the larger box to collect the cement as it settles. The portion thus preserved consists of the heavy, gritty, and inactive parts of the cement, which is without adhesive power, and which acts simply as so much sand. This equals about ten per cent. of the whole mass of cement.

Cements containing a larger amount than usual of this gritty portion may, when mixed pure, stand a high test, but will not bear a large admixture of sand. With this gritty part settles the true cement, which we call the "matrix." This is that portion which is capable of crystallization or hydro-silicatization called "setting." This portion of the cement is the only one of value, and is about eighty per cent. of it.

The third or lighter portion, which is washed away with the overflowing water, consists of impurities, light earthy matter, uncombined lime and clay and soluble salts. This portion of the cement is entirely without adhesive power, and, when separated from the other portions of the cement, acts in all respects like the impure and dirty clays. When dry it shrivels and contracts, and when wet expands and becomes slippery. This portion of the cement is the cause of the unsightly checks, and what appears to be cracks, but which are simply projections of this earthy portion, which, by its own action in contracting and expanding, and the crystallization of the cement, has become separated from it. With this earthy portion the alkaline salts, consisting mainly of soda and potash, escape. This is the portion that causes the efflorescence or white appearance on the stone as heretofore made, and also what is known as *laitance* on concrete laid in water.

The light, earthy, and soluble portions having been removed from the cement, the supply of water is turned off, and it is all allowed to escape from the wash-box.

The cement, freed from its deleterious portions, and being thus saturated or supplied with the proper amount of water, is thoroughly mixed by machinery, or by means of shovels, hoes, or rakes, with clean, dry, sharp sand, in the proportions of from three to six parts of sand to one of cement, according to the strength desired.

The beton thus mixed is rammed into position, layer by layer, with a pounder, having knobs or projections to make an irregular face. The irregularities made by the pounder on the top of the layer leaves it rough, for the better bonding of the succeeding layers.

During the process of ramming or compacting, large stones of suitable shape to form a good bond may be put into the mold or mass, and the beton rammed around and between them, the stones not being allowed to come in direct contact with each other. This gives stronger work, and allows more thorough ramming and the use of larger stones than where in the usual way broken stone is mixed with the sand and cement before being put into the mold or mass.

The phenomenon of *laitance* is one of the gravest difficulties besetting the laying of concrete under water. It is caused by the impurities hereinbefore set forth. When the concrete is mixed in the ordinary manner, so as to form a semi-liquid mass, these impurities rise to the top of the layer in position, gradually subside and deposit an unctuous stratum. Thus between each new layer of the concrete is interposed a slippery layer, utterly preventing any union or bond between the layers of concrete, and very seriously impairing the solidity and strength of the structure. The former of my processes prevents this, since the beton is sufficiently dry to prohibit any movement of its component parts. The second modification of the process prevents it for the same reason, and because the impurities forming the laitance are themselves eliminated.

I do not claim as new the mixing of sand and cement with sufficient water to form a pulverulent pasty powder, nor a mixture of sand and cement and water sufficient to form a semi-liquid mass, as in ordinary concretes.

Having thus described and limited my invention, what I do claim is—

1. As a new manufacture, a beton formed of sand and cement, mixed with water to the point of saturation, substantially as hereinbefore set forth.

2. The process of purifying cement by separating therefrom the impure, light, and earthy matters, the uncombined lime and clay and the soluble salts, substantially as hereinbefore set forth.

3. As a new manufacture, a beton composed of sand and cement purified, as hereinbefore set forth, mixed with water to the point of saturation.

4. As a new manufacture, the stone or monolithic masonry made from the substances and treated in the manner described.

In testimony that I claim the foregoing improvement in manufacture of beton, as above described, I have hereunto set my hand.

JOHN C. GOODRIDGE, Jr.

Witnesses:
ISAAC J. MACCABE,
E. BARTLETT.